United States Patent
Sogabe et al.

[11] Patent Number: 5,870,273
[45] Date of Patent: Feb. 9, 1999

[54] MULTI-FUNCTIONAL MULTILAYER DEVICE AND METHOD FOR MAKING

[75] Inventors: Tomohiro Sogabe; Yasushi Enokido, both of Chiba, Japan

[73] Assignee: TDK Corporation, Tokyo, Japan

[21] Appl. No.: 935,135

[22] Filed: Sep. 22, 1997

[30] Foreign Application Priority Data

Oct. 18, 1996 [JP] Japan .................................. 8-297438

[51] Int. Cl.$^6$ ........................... H01G 4/228; H01G 4/06; H01C 7/10
[52] U.S. Cl. ...................... 361/306.3; 361/311; 361/313; 361/321.2; 361/322; 338/20; 338/21
[58] Field of Search ................................ 361/306.3, 305, 361/307, 308, 309, 311–313, 321.1, 321.2, 321.4, 321.5, 322; 338/20, 21; 333/181, 184

[56] References Cited

U.S. PATENT DOCUMENTS

| | | | |
|---|---|---|---|
| 5,072,329 | 12/1991 | Galvagni ................................ | 321/321 |
| 5,119,062 | 6/1992 | Nakamura et al. ..................... | 338/20 |
| 5,548,474 | 8/1996 | Chen et al. ............................. | 361/313 |
| 5,672,220 | 9/1997 | Omori et al. ........................... | 156/89 |
| 5,739,742 | 4/1998 | Iga et al. ................................ | 338/21 |

FOREIGN PATENT DOCUMENTS 63-32911  2/1988  Japan .

*Primary Examiner*—Bot L. Ledynh
*Assistant Examiner*—Anthony Dinkins
*Attorney, Agent, or Firm*—Oblon, Spivak, McClelland, Maier & Neustadt, P.C.

[57] ABSTRACT

In a multi-functional multilayer device including a body (10) having a varistor section (2) and a capacitor section (3) stacked and integrated therewith, the adhesion between a varistor layer and a dielectric layer is improved when the varistor layer (22) contains zinc oxide as a main component and at least one lanthanide oxide as an auxiliary component, and the dielectric layer (32) contains titanium oxide or lanthanum/titanium oxide as a main component. The device experiences little warpage upon firing when glass is added to the dielectric layer. A high resistivity intermediate layer (5) disposed between the varistor and capacitor sections (2 and 3) prevents the deterioration or loss of varistor and capacitor properties by interdiffusion of elements between the varistor and capacitor sections.

12 Claims, 5 Drawing Sheets

MULTI-FUNCTIONAL MULTILAYER DEVICE AND METHOD FOR MAKING

This invention relates to a device for protecting electronic equipment from overvoltage and noise and more particularly, to a multi-functional multilayer device having a varistor and a capacitor integrated together and a method for preparing the same.

PRIOR ART

With the recent rapid advance of semiconductor devices and circuits such as MPU, the use of semiconductor devices and circuits in personal computers, meters, household appliances, communications equipment and power equipment becomes widespread, promoting the size reduction and performance improvement of these equipment. On the contrary to such advances, these equipment and parts used therein are not fully satisfactory in withstand voltage, surge resistance, and noise resistance. It is then a very important task to protect such equipment and parts from abnormal surge and noise or to stabilize circuit voltage. To overcome these tasks, there is a demand for the development of a voltage-dependent nonlinear resistance device or varistor which has significant voltage non-linearity, great energy handling capability, great surge resistance and a long lifetime, and is inexpensive.

Commonly used prior art varistors contain strontium titanate ($SrTiO_3$), zinc oxide (ZnO), etc. as a main component. Inter alia, varistors based on zinc oxide are generally characterized by a low clamping voltage and a high voltage-dependent nonlinearity index. The zinc oxide varistors are thus suitable for protecting against over-voltage those equipment constructed by semiconductor and similar devices having a low overcurrent handling capability.

However, the zinc oxide varistors alone cannot absorb all noises. Owing to the mechanism through which the varistors exert their characteristics, the zinc oxide varistors are ineffective to quickly rising noise, for example, noise with a short wavelength of less than 10 ns. and are insufficient as antistatic parts. In the prior art, combinations of a capacitor and a resistor are used in order to absorb noise of such short wavelength. The capacitor/resistor combination, however, has no voltage clamping capacity, leaving a problem that the capacitor and circuit can fail due to overvoltage. Because of the absence of surge arresting capacity, the capacitor/resistor combination is also ineffective to substantial surge current like lightning surge.

One prior art approach for accommodating both quickly rising noise and overcurrent is to mount a parallel connection of a varistor and a capacitor. In order to separately mount these units on a printed circuit board, steps of electrode formation, lead wire soldering and resin encapsulation are necessary for each of the units. It is also necessary to insert lead wires into holes in the printed circuit board, followed by soldering. There is a need for a multi-functional device which takes advantage of both a zinc oxide varistor and a capacitor.

Under the circumstances, JP-A 32911/1988, for example, discloses a noise absorber of the structure having a varistor and a capacitor integrated together. In this noise absorber, a first multilayer body consisting of a varistor material and electrodes is formed integral with a second multilayer body consisting of a capacitor material and electrodes. This structure can take advantage of both a varistor and a capacitor. In this patent, ZnO having a minor amount of $Bi_2O_3$ added thereto and $TiO_2$ having a minor amount of a semiconductor element such as $Sb_2O_3$ added thereto are disclosed as the varistor material while $BaTiO_3$ is disclosed as the capacitor material. With a combination of the varistor material and the capacitor material disclosed therein, the bond between the first multilayer body and the second multilayer body is not satisfactory. A multilayer body formed from both the materials by co-firing is susceptible to delamination. Since both the materials have significantly different heat shrinkage curves, substantial warpage can occur upon co-firing. As a result, the outer appearance of the fired body becomes unacceptable as a commercial product. Warpage also promotes delamination when combined with the essentially poor adhesion. Additionally, the interdiffusion of elements between the varistor material and the capacitor material can deteriorate or even extinguish the varistor and dielectric properties. For these reasons, it is difficult to manufacture a practically acceptable multi-functional device having a varistor section integrated with a capacitor section.

SUMMARY OF THE INVENTION

Therefore, a first object of the invention is to provide a multi-functional multilayer device comprising an integrated layer structure of a varistor section and a capacitor section wherein the capacitor section absorbs quickly rising noise and the varistor section absorbs substantial surge current, the device featuring high reliability owing to the improved adhesion between the varistor section and the capacitor section.

A second object of the invention is to provide such a multi-functional multilayer device experiencing minimized warpage.

A third object of the invention is to provide such a multi-functional multilayer device which prevents the varistor and dielectric properties from being deteriorated or extinguished by the interdiffusion of elements between the varistor section and the capacitor section.

According to the present invention, there is provided a multi-functional multilayer device comprising a body having a varistor section and a capacitor section disposed thereon and a pair of terminal electrodes formed on outer surfaces of the body. The varistor section includes at least one varistor layer interleaved between internal plates, the capacitor section includes at least one dielectric layer interleaved between internal plates, and the varistor section and the capacitor section are electrically connected in parallel by the terminal electrodes. The varistor layer contains zinc oxide as a main component and at least one lanthanide oxide as an auxiliary component. The dielectric layer contains titanium oxide or an oxide containing lanthanum and titanium as a main component.

Preferably, the dielectric layer further contains glass. The content of glass is 0.1 to 5% by weight of the dielectric layer. Also preferably, the dielectric layer further contains manganese oxide. The content of manganese oxide is 0.1 to 3% by weight of the dielectric layer.

In one preferred embodiment, an intermediate layer is disposed between the varistor section and the capacitor section, the intermediate layer having a resistivity which is higher than the lower one of the resistivity of the varistor layer and the resistivity of the dielectric layer. The intermediate layer may contain the oxide of the varistor layer and/or the oxide of the dielectric layer as a main component.

Preferably, the internal plate of the varistor section and the internal plate of the capacitor section which are disposed adjacent to each other via the interface between the varistor section and the capacitor section are connected so as to receive an equal potential.

In another aspect of the invention, the multi-functional multilayer device defined above is prepared by forming a green body comprising a green sheet containing a raw material powder of the varistor layer and a green sheet containing a raw material powder of the dielectric layer and firing the green body in an atmosphere having an oxygen concentration higher than the oxygen concentration of air in a temperature range of higher than 700° C.

BRIEF DESCRIPTION OF THE DRAWINGS

These and further features of the present invention will be apparent with reference to the following description and drawings, wherein.

FUNCTION

The multi-functional multilayer device according to the invention wherein the varistor section is integrated with the capacitor section offers high surge resistance and high voltage-dependent nonlinearity characteristic of the zinc oxide varistor, eliminates the drawback of the zinc oxide varistor that it is non-responsive to quickly rising noise, and can absorb noise with a rise time of less than 10 ns. The varistor voltage and capacity can be controlled by suitably selecting the thickness and number of varistor layers and the thickness and number of dielectric layers. Since the varistor section is integrated with the capacitor section, the cost of manufacture is reduced as compared with a parallel connection of a varistor chip and a capacitor chip.

Searching for the dielectric material which forms a close bond with a zinc oxide base varistor layer, we have found that the delamination between the varistor section and the capacitor section can be restrained by using titanium oxide ($TiO_2$) or a La—Ti oxide as typified by $La_2Ti_2O_7$ as a main component of the dielectric layer. $La_2Ti_2O_7$ is especially preferred because it is well bondable with the zinc oxide varistor layer, has excellent dielectric properties, especially high-frequency response, and provides effective guard against quickly rising noise.

Figure 7:
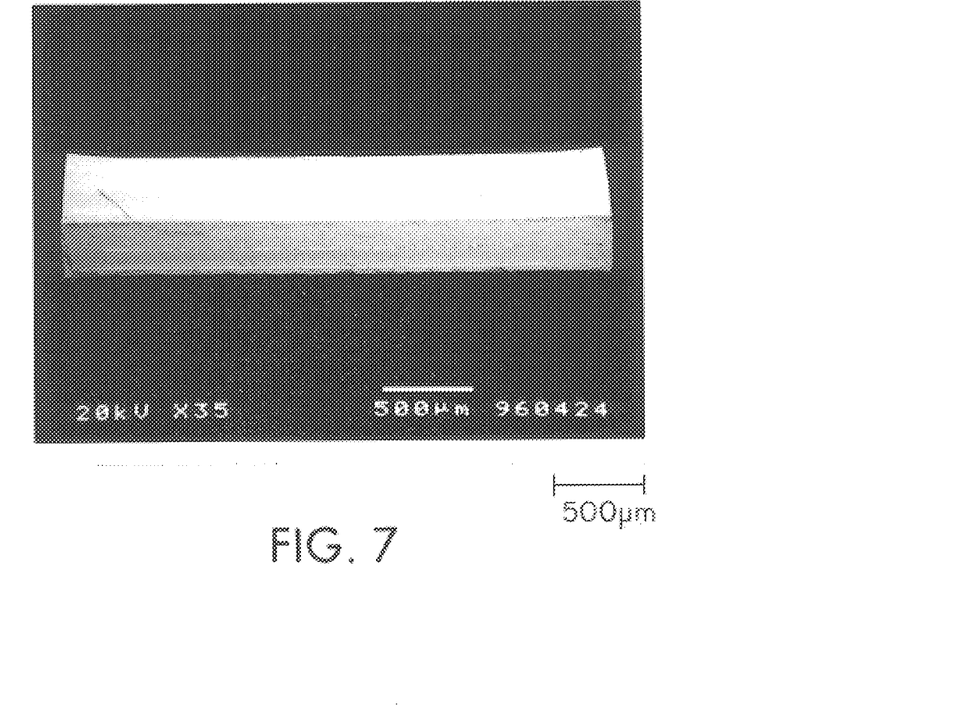
FIG. 7 is a SEM photomicrograph of a device body having a glass-containing dielectric layer.
Figure 8:
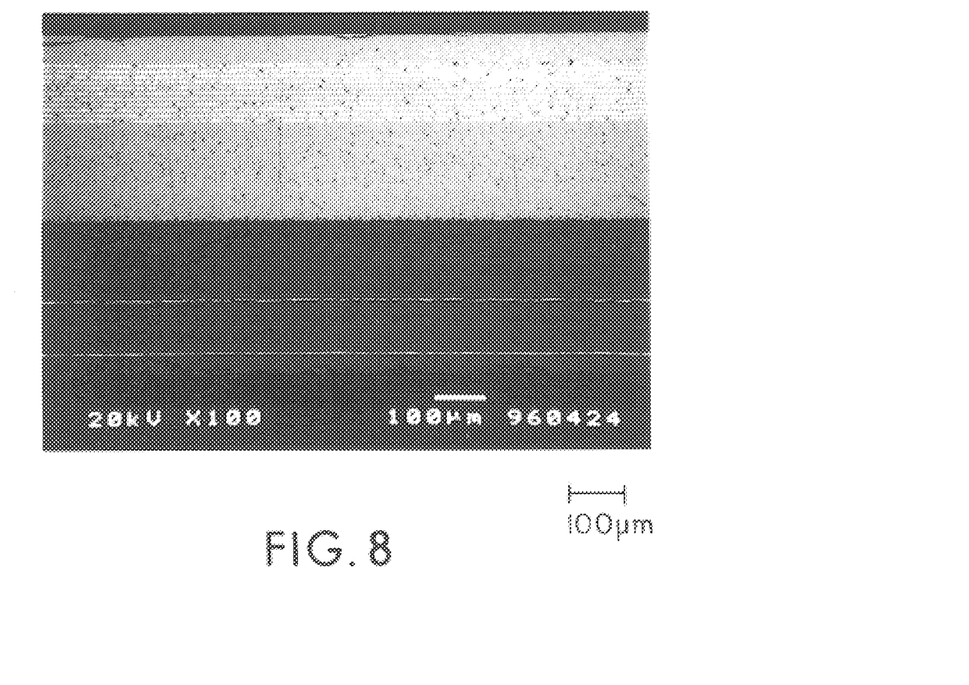
FIG. 8 is a higher magnification SEM photomicrograph of the same body as FIG. 7.
Figure 9:
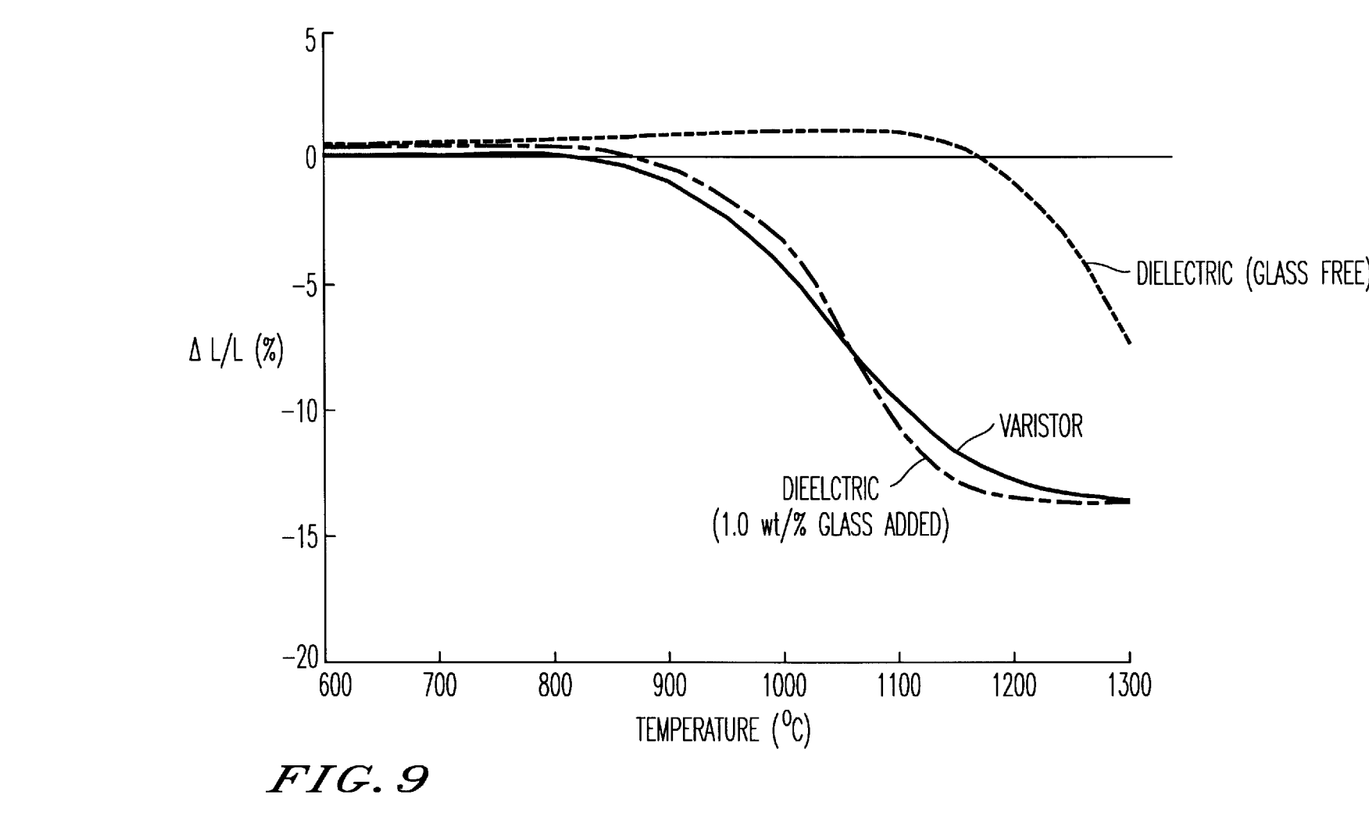
FIG. 9 is a graph showing heat shrinkage curves of a varistor layer green sheet, a dielectric layer green sheet containing dielectric and glass, and a dielectric layer green sheet containing only dielectric.

In the device of the invention, the varistor layers and the dielectric layers are formed by co-firing. The integrated body is susceptible to warpage because both the layers have different heat shrinkage curves. In one embodiment of the invention, glass is added to a dielectric layer so that the dielectric layer may have a heat shrinkage curve approximate to that of the varistor layer as shown in FIG. 9. Then the warpage of the integrated body or device can be restrained as shown in FIGS. 7 and 8, preventing the delamination by warpage between the varistor section and the capacitor section.

In one embodiment of the invention wherein an intermediate layer having a relatively high resistivity is disposed at the interface between the varistor section and the capacitor section, the intermediate layer serves to prevent both the sections from obscuring their properties by interdiffusion of elements and especially, to increase the voltage-dependent nonlinearity index of the varistor section. The intermediate layer is also effective for suppressing leakage current and improving reliability. Where the intermediate layer contains the varistor layer-constructing elements and/or the dielectric layer-constructing elements as a main component, the intermediate layer becomes well adhesive to both the varistor section and the capacitor section and its difference of heat shrinkage curve from the varistor layer and the dielectric layer is reduced. The risk of delamination is eliminated.

In manufacturing a multilayer device, a varistor layer and a dielectric layer of different compositions are simultaneously fired. If firing is done under conditions as used for prior art zinc oxide varistors, the varistor layer becomes short of oxygen, failing to provide good varistor properties. In contrast, by controlling the oxygen concentration of the surrounding atmosphere in a duration of firing above a specific temperature according to the invention, there are achieved varistor properties equivalent to those of zinc oxide varistors which are fired alone.

DETAILED DESCRIPTION OF THE INVENTION

Device structure

Figure 1:
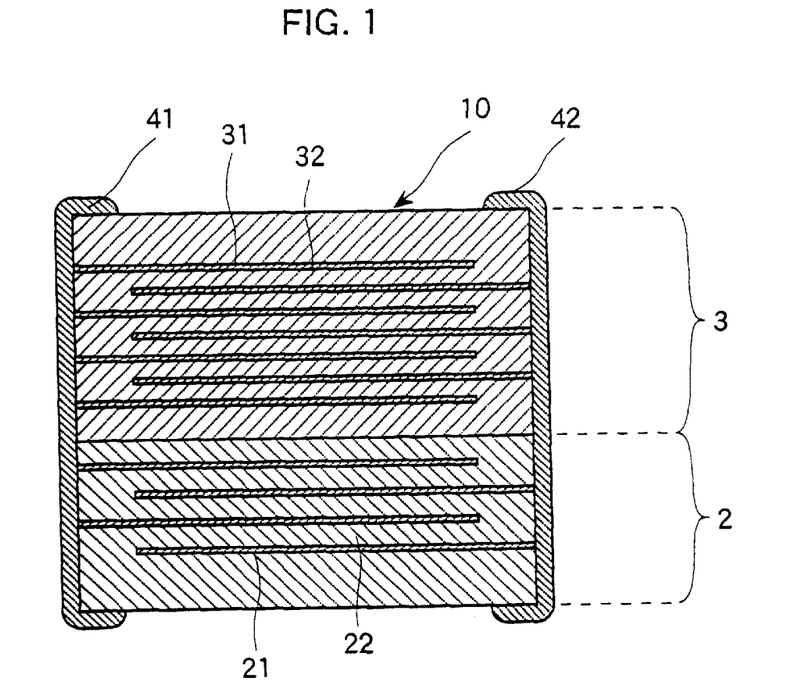
FIG. 1 is a schematic cross-sectional view of a multi-functional multilayer device according to one embodiment of the invention.

Referring to FIG. 1, there is illustrated one exemplary structure of the multi-functional multilayer device according to the present invention. The multi-functional multilayer device includes a body 10 having a varistor section 2 and a capacitor section 3 disposed thereon in a parallel layer arrangement. A pair of terminal electrodes 41 and 42 are formed on opposed outer surfaces of the body 10.

The varistor section 2 includes at least one varistor layer 22 interleaved between varistor internal plates 21. A pair of internal plates 21 separated by the varistor layer 22 are extended to opposed side surfaces of the body 10 and connected to the terminal electrodes 41 and 42 formed thereon, respectively. The capacitor section 3 includes at least one dielectric layer 32 interleaved between capacitor internal plates 31. A pair of internal plates 31 separated by the dielectric layer 32 are extended to opposed side surfaces of the body 10 and connected to the terminal electrodes 41 and 42 formed thereon, respectively. The varistor section 2 and the capacitor section 3 are electrically connected in parallel by the terminal electrodes 41 and 42.

The internal plate of the varistor section 2 and the internal plate of the capacitor section 3 which are disposed adjacent to each other via the interface between the varistor section and the capacitor section are connected to receive an equal potential so that no electric field is applied across the interface.

Varistor Layer

The varistor layer contains zinc oxide as a main component and at least one lanthanide oxide as an auxiliary component. The lanthanides include La, Pr, Nd, Sm, Eu, Gd, Tb, Dy, Ho, Er, Tm, Yb, and Lu. Two or more lanthanides may be used in any desired mix ratio.

Throughout the specification, the content of an oxide in the varistor layer or dielectric layer is calculated as an oxide of a stoichiometric composition.

The content of zinc oxide calculated as ZnO is preferably at least 80% by weight, more preferably 85 to 99% by weight of the varistor layer. A varistor layer with a less content of zinc oxide is likely to deteriorate in a load life test in a hot humid atmosphere.

The content of lanthanide oxide is preferably 0.05 to 8% by weight of the varistor layer. Outside this range, a less content of lanthanide oxide would exacerbate voltage-dependent nonlinearity whereas a greater content of lanthanide oxide would reduce energy handling capability. Note that the content of lanthanide oxide is calculated as $R_2O_3$ wherein R is a lanthanide, with the exception that praseodymium oxide is calculated as $Pr_6O_{11}$.

The varistor layer must contain at least zinc oxide and lanthanide oxide. An auxiliary component other than the lanthanide oxide is added if desired. The auxiliary component which can be added to the zinc oxide base varistor is disclosed in JP-A 201531/1995 by the same assignee as the present application, for example. Any preferred composition known in the prior art may be used in the varistor layer according to the invention.

Described below are illustrative examples of the auxiliary component other than the lanthanide oxide.

Cobalt oxide is preferably contained as the auxiliary component. The content of cobalt oxide is preferably 0.1 to 10% by weight calculated as $Co_3O_4$. A less content of cobalt oxide would exacerbate voltage-dependent nonlinearity whereas a greater content of cobalt oxide would reduce energy handling capability.

Another preferred auxiliary component is an oxide of at least one of boron (B), aluminum (Al), gallium (Ga) and indium (In) among Group IIIb elements. The total content of these oxides is preferably $1 \times 10^{-4}$ to $1 \times 10^{-1}$% by weight calculated as $B_2O_3$, $Al_2O_3$, $Ga_2O_3$, and $In_2O_3$. A less content would allow the clamping voltage to increase whereas a greater content would increase leakage current.

Lead oxide may also be contained as the auxiliary component. Lead oxide is effective for improving energy handling capability. The content of lead oxide is preferably up to 2% by weight, more preferably up to 1% by weight calculated as PbO. A greater content would rather reduce the maximum-energy capability.

At least one of oxides of vanadium (V), germanium (Ge), niobium (Nb) and tantalum (Ta) and/or bismuth (Bi) oxide may also be contained as the auxiliary component. The total content of V, Ge, Nb and Ta oxides is preferably up to 0.2% by weight calculated as $V_2O_5$, $GeO_2$, $Nb_2O_5$, and $Ta_2O_5$. The content of bismuth oxide is up to 0.5% by weight calculated as $Bi_2O_5$. These oxides are effective for improving voltage-dependent nonlinearity while a too much content thereof would rather reduce voltage-dependent nonlinearity.

At least one of oxides of chromium (Cr) and silicon (Si) may also be contained as the auxiliary component. The content of chromium oxide is preferably 0.01 to 1% by weight calculated as $Cr_2O_3$ and the content of silicon oxide is preferably 0.001 to 0.5% by weight calculated as $SiO_2$.

A further preferred auxiliary component is an oxide of at least one of potassium (K), rubidium (Rb), and cesium (Cs) among Group Ia elements. The total content of these oxides is preferably 0.01 to 1% by weight calculated as $K_2O$, $Rb_2O$, and $Cs_2O$.

A still further preferred auxiliary component is an oxide of at least one of magnesium (Mg), calcium (Ca), strontium (Sr), and barium (Ba) among Group IIa elements. The total content of these oxides is preferably 0.01 to 4% by weight calculated as MgO, CaO, SrO, and BaO.

The thickness of varistor layers and the number of varistor layers (that is, the total number of varistor layers each interleaved between varistor internal plates) are not critical and may be properly determined in accordance with the desired varistor characteristics. The thickness is usually 5 to 200 μm, preferably 10 to 100 μm. The number of varistor layers is usually 1 to 30, preferably 10 to 20.

Dielectric Layer

The dielectric layer contains titanium oxide as a main component. Alternatively, the dielectric layer contains an oxide containing lanthanum (La) and titanium (Ti) as a main component. More particularly, an oxide of a composition centering at $TiO_2$ or an oxide of a composition centering at $La_2Ti_2O_7$ is preferred. Provided that the main component is calculated as $La_2O_3$ and $TiO_2$, the content of $TiO_2$ is up to 100% by weight, preferably 1 to 80% by weight, more preferably 20 to 50% by weight of the main component. It is noted that $La_2Ti_2O_7$ consists of 28.17% by weight of $TiO_2$ and 71.83% by weight of $La_2O_3$. The content of main component oxide is preferably at least 70%, more preferably at least 90%, most preferably at least 97% by weight of the dielectric layer.

The dielectric layer may contain various auxiliary components in addition to the main component. Manganese oxide is a preferred auxiliary component. Manganese oxide is effective for improving the temperature characteristics of the capacitance of the capacitor section. In this regard, it is noted that the device of the invention can be used in the temperature range between −55° C. and 125° C. The content of manganese oxide is preferably up to 3%, more preferably 0.1 to 3% by weight calculated as MnO.

Glass is preferably contained in the dielectric layer in addition to the above-mentioned main and auxiliary components. Glass powder is mixed with a dielectric raw material in order that the heat shrinkage curve of a dielectric layer upon firing be approximate to that of a varistor layer upon firing. After a mixture of the dielectric raw material and glass powder is fired, glass is left in the dielectric layer.

The composition of glass is not critical insofar as it can control the heat shrinkage curve of a dielectric layer as mentioned just above. Borosilicate glass is preferred. Zinc borosilicate glass containing zinc oxide is especially preferred. The use of glass containing zinc oxide improves the matching between the dielectric layer and the adjacent varistor or intermediate layer (intermediate layer will be described later). The content of zinc oxide in glass is preferably 20 to 70% by weight calculated as ZnO. The glass preferably has a softening point of 400° to 800° C.

Preferably the dielectric layer contains 0.1 to 5% by weight of glass. A less content of glass would be ineffective for its purpose whereas a too much content of glass would adversely affect capacitive characteristics. By adding borosilicate glass to a dielectric material in such an amount, the heat shrinkage curve of the dielectric layer can be fully approximate to that of the varistor layer.

The thickness of dielectric layers and the number of dielectric layers (that is, the total number of dielectric layers each interleaved between capacitor internal plates) are not critical and may be properly determined in accordance with the desired capacitor characteristics. The thickness is usually 1 to 20 µm, preferably 5 to 10 µm. The number of dielectric layers is usually 1 to 50, preferably 10 to 20.

Internal Plate

Varistor and capacitor internal plates are fired simultaneous with varistor layers and capacitor layers. Then the conductor material of the internal plates may be properly selected from silver (Ag), silver alloys, palladium (Pd) and other materials which are used in prior art multilayer chip capacitors. Exemplary silver alloys are Ag—Pd, Ag—Pt, and Ag—Pd—Pt, to name a few. Often, the same conductor material is used for both the varistor and capacitor internal plates.

The internal plates each usually have a thickness of 1 to 5 µm.

Terminal Electrode

The terminal electrodes may be formed of an appropriate material selected from the conductor materials mentioned just above for the internal plates. Since the terminal electrodes are generally formed after firing of the device body, they can be fired at lower temperatures. Therefore, silver base conductor materials which must be fired at low temperatures can be used as the terminal electrodes.

The terminal electrodes each usually have a thickness of 30 to 60 µm.

In one application wherein the device of the invention is used as a surface mount part, it is soldered to a wiring board. Then the terminal electrodes are preferably provided on their surface with a plating film for improving solder wettability and preventing dissolution into solder. The preferred plating film is a film of tin (Sn) or tin-lead (Sn—Pb). Further preferably the terminal electrodes on the surface is precoated with a plating film of nickel or copper as a primer layer under the plating film in order to prevent the silver of the terminal electrodes from dissolving into Sn or Sn—Pb.

Intermediate Layer

Figure 2:
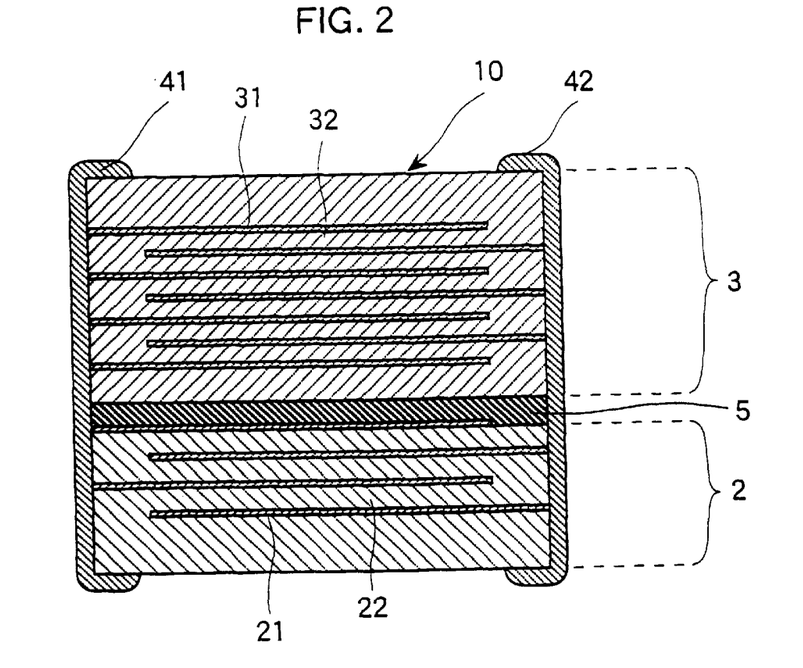
FIG. 2 is a schematic cross-sectional view of a multi-functional multilayer device according to another embodiment of the invention.

In one preferred embodiment of the invention, an intermediate layer 5 is disposed between the varistor section 2 and the capacitor section 3 as shown in FIG. 2. The intermediate layer 5 has a resistivity which is higher than the lower one of the resistivity of the varistor layer 22 and the resistivity of the dielectric layer 32, preferably higher than both the resistivities of the varistor layer and the dielectric layer. The intermediate layer is provided for the following reason.

When varistor layers and dielectric layers of the above-mentioned compositions are co-fired, interdiffusion of elements occurs across the interface between the varistor and dielectric layers. More particularly, the auxiliary components, especially manganese mainly diffuse from the dielectric layer and the auxiliary components, especially cobalt, chromium and lanthanide (typically Pr) mainly diffuse from the varistor layer. The interdiffusion reduces the resistivity near the interface between the varistor and dielectric layers, especially the resistivity of the varistor layer near the interface, creating a lower resistivity region at the interface. This lower resistivity region has a lower resistivity than the varistor layer and thus allows short-circuiting, inviting an increase of leakage current and a lowering of voltage-dependent nonlinearity index. In contrast, the provision of the intermediate layer prevents a lower resistivity region from being created even when interdiffusion of elements occurs, inhibiting deterioration of device properties.

The material of which the intermediate layer is constructed is not critical insofar as the resistivity of the fired material satisfies the above-mentioned relationship. Various insulating materials such as magnesia, mullite, and titania may be used. When the adhesion of the intermediate layer to the varistor layer and the dielectric layer and a matching of heat shrinkage curves are taken into account, a material containing the varistor layer-forming oxide and/or the capacitor layer-forming oxide as a main component is preferably used. Since the varistor layer generally has a lower resistivity than the dielectric layer and since the varistor layer experiences a greater resistivity lowering by the above-mentioned interdiffusion of elements, the intermediate layer is desirably formed of an oxide material containing the varistor layer-forming oxide as a main component.

The composition of an intermediate layer-forming charge (or raw material) containing the varistor layer-forming oxide as a main component may be obtained by properly changing the content of auxiliary components in the varistor layer-forming material so as to provide a higher resistivity after firing. More particularly, the charge has such a composition that the total content of auxiliary components, especially cobalt, chromium and lanthanide (typically Pr) calculated as oxides is preferably 1.2 to 5 times, more preferably 1.5 to 3 times the total content of auxiliary components in the varistor layer, and further preferably, the contents of respective auxiliary components are excessive by such a factor. It is understood, however, that among the auxiliary components, aluminum should not be added to the intermediate layer because aluminum acts as a donor to reduce resistivity. The auxiliary component elements added in excess are mainly localized at grain boundaries to suppress grain growth upon firing and constitute potential barriers to increase resistivity. Since sufficient auxiliary components are left behind in the intermediate layer even after firing causing diffusion of elements, the intermediate layer as fired can have a higher resistivity than the varistor layer. The absence of aluminum also allows the intermediate layer to have a higher resistivity.

The thickness of the intermediate layer is not critical. Usually, the intermediate layer has such a thickness that the diffusion of elements from the varistor layer and the dielectric layer does not have substantial influence on the counter layers. Preferably the intermediate layer is at least 1 µm thick, especially at least 5 µm thick. No upper limit is imposed on the thickness of the intermediate layer although the thickness of the intermediate layer need not exceed 100 µm. A thickness of less than 80 µm is satisfactory in most cases. The intermediate layer eventually includes on either side a region into which elements have diffused from an adjacent layer of different composition (to be referred to as a diffusion region). The diffusion region is usually about 1 to 50 µm thick. The diffusion region can be confirmed by electron probe microanalysis (EPMA), for example.

The diffusion regions of the intermediate layer preferably have a resistivity of about $10^{10}$ to $10^{13}$ Ω·cm. The region of the intermediate layer located between the diffusion regions has a higher resistivity. On the other hand, the varistor layer usually has a resistivity of about $10^8$ to $10^{12}$ Ω·cm and the dielectric layer usually has a resistivity of about $10^{11}$ to $10^{13}$ Ω·cm.

Preparation

The multi-functional multilayer device of the invention can be prepared by a conventional process as are prior art multilayer chip parts such as multilayer ceramic capacitors. The preferred method for preparing the device of the invention is described below.

First of all, a green chip is prepared, typically by a sheet or printing technique as used in the preparation of prior art multilayer chip parts. In the sheet technique, raw material powders for the varistor material, dielectric material, internal plate material and optionally intermediate layer material are first furnished. As the raw material powder for the dielectric material, a calcined product of a starting raw material is used. The raw material powders are respectively mixed with an organic vehicle to form pastes. The pastes excluding the internal plate-forming paste are formed into sheets, that is, green sheets. Each green sheet to form a layer adjacent to an internal plate is printed with the internal plate-forming paste. The printed green sheets are laminated in the predetermined sequence and compacted. The laminate is cut to predetermined dimensions, obtaining a green chip. Next, the green chip is fired to form a device body. The terminal electrode-forming paste is printed or transferred to the surface of the body where the internal plates are exposed, and then baked. If desired, plating films are formed on the surface of the terminal electrodes. The device is completed in this way.

The raw material powder for the varistor layer may be a composite oxide or a mixture of oxides. It is also possible to use a mixture of compounds selected from various compounds which convert into a composite oxide or oxides upon firing, for example, carbonates, oxalates, nitrates, hydroxides and organometallic compounds. The same applies to the starting raw material for the dielectric layer. Glass powder may be used as the glass raw material for the dielectric layer. With respect to the preferred mean particle size of these raw material powders, the powder for the main component of the varistor layer has a size of about 0.1 to 5 $\mu$m, the powder for the auxiliary component of the varistor layer has a size of about 0.1 to 3 $\mu$m, the powder for the dielectric layer has a size of about 0.1 to 3 $\mu$m, and the glass powder for the dielectric layer has a size of about 1 to 10 $\mu$m. The raw material for the auxiliary component of the varistor layer may also be added in solution form. As the raw material powder for the intermediate layer, a raw material similar to the varistor layer raw material or dielectric layer raw material may be used in accordance with the desired composition of the intermediate layer.

The organic vehicle used herein is a solution of a binder in an organic solvent. The binder used herein is not critical, and a choice may be made among various conventional binders such as ethyl cellulose. The organic solvent used herein is not critical, and a choice may be made among various conventional organic solvents such as terpineol, butylcarbinol, acetone and toluene in accordance with a particular application technique such as printing and sheet techniques.

Preferably, the starting material for the dielectric layer is calcined in air at 1,100° to 1,300° C. for about 1 to 4 hours.

For the firing of the green chip, optimum conditions are selected in accordance with the varistor layer composition, dielectric layer composition and internal plate composition. The firing process includes heating, holding and cooling steps. The firing conditions are preferably selected from the following range. The heating and cooling rates are preferably 50° to 400° C./hr. The firing temperature or the holding temperature in the holding step is preferably 900° to 1,400° C., more preferably 1,100° to 1,300° C. The firing time or the retention time in the holding step is preferably 1 to 8 hours, more preferably 2 to 6 hours. The firing atmosphere may be either an oxidizing atmosphere such as air and oxygen or a non-oxidizing atmosphere such as nitrogen, preferably an atmosphere having a higher oxygen concentration than air. Preferably that portion of the overall firing step where the temperature is above 700° C., more preferably above 500° C. is carried out in an atmosphere having a higher oxygen concentration than air. In this regard, a higher oxygen concentration is preferred, with a 100% oxygen atmosphere being most preferred. A similar high oxygen concentration atmosphere may also be employed in a lower temperature region although the atmosphere employed in a lower temperature region is preferably air for the reason of economy.

It is understood that binder removal is generally carried out prior to firing. The binder removal is preferably carried out in air. The binder removal may be incorporated in the heating step. More illustratively, the binder can be removed by interrupting heating or lowering the heating rate in a part of the heating step.

The device body resulting from firing is preferably polished as by barrel polishing. This polishing can correct the bend or bulge of the body at edges, finishing the body to predetermined dimensions.

The conditions under which the terminal electrode-forming paste is fired may be properly determined in accordance with a particular composition of the terminal electrodes. Often, the firing atmosphere is air, the firing temperature is 500° to 1,000° C., and the firing time is about 10 to 60 minutes.

Where a plating film as mentioned previously is formed on the surface of terminal electrodes, the surface of the body except for the terminal electrode surface is preferably covered with a protective coating prior to plating. The protective coating is to protect the body from the plating solution. The composition of the protective coating is not critical although a glass coating is typically used. The glass coating can be formed by applying a paste containing glass powder and an organic vehicle, followed by firing. Understandably, the protective coating need not be removed from the device surface after the plating film is formed on the terminal electrodes.

EXAMPLE

Examples of the invention are given below by way of illustration and not by way of limitation.

Device Having Intermediate Layer

Multi-functional multilayer device samples having an intermediate layer were prepared by the following procedure.

A mono-pot loaded with $ZrO_2$ balls was charged with pure water and a dispersant. A starting material of the following composition for varistor layers was admitted therein.

| Varistor layer raw material | |
|---|---|
| ZnO | 96.8% by weight |
| $CO_3O_4$ | 0.8% |
| $Pr_6O_{11}$ | 2.0% |
| $Cr_2O_3$ | 0.2% |
| $Al_2O_3$ | 0.003% |
| $SrCO_3$ | 0.2% (calculated as SrO) |

The pot was mounted on a rotating table whereby the ingredients were mixed. The mixture was transferred to an evaporating dish, dried in a dryer, and ground. The ground mixture was combined with an organic vehicle and mixed and milled for 16 hours to form a paste. The paste was sheeted by means of a doctor blade, obtaining varistor layer green sheets.

An intermediate layer green sheet was obtained by the same procedure as the varistor layer green sheet except that a starting material of the following composition was used.

| Intermediate layer raw material | |
| --- | --- |
| ZnO | 92.3% by weight |
| $Co_3O_4$ | 1.8% |
| $Pr_6O_{11}$ | 4.9% |
| $Cr_2O_3$ | 0.6% |
| $SrCO_3$ | 0.4% (calculated as SrO) |

A starting material of the following composition for dielectric layers was furnished.

| Dielectric layer raw material | |
| --- | --- |
| $La_2O_3$ | 66.3% by weight |
| $TiO_2$ | 33.5% |
| $MnCO_3$ | 0.2% (calculated as MnO) |

The ingredients were mixed, ground, dried and calcined at 1,200° C. for 2 hours. The calcined product was combined with glass powder, mixed and ground. The mixture contained 1% by weight of glass. The glass powder used herein had the following composition.

| | |
| --- | --- |
| ZnO | 59.70% by weight |
| $B_2O_3$ | 21.72% |
| $SiO_2$ | 9.64% |
| CaO | 8.94% |

An organic vehicle was added to the mixture, which was mixed and milled for 16 hours to form a paste. The paste was sheeted by means of a doctor blade, obtaining dielectric layer green sheets.

An internal plate-forming paste containing Ag—Pd powder was printed on the varistor layer green sheets and dielectric layer green sheets. These green sheets including the intermediate layer green sheet were laid up and compacted to form a laminate of the structure shown in FIG. 1. More particularly, a predetermined number of the varistor layer green sheets were laid up, the intermediate layer green sheet was laid thereon, and a predetermined number of the dielectric layer green sheets were further laid up thereon. The green sheets were stacked such that only one varistor layer was interleaved between internal plates (that is, the number of varistor layers each interleaved between internal plates was 1) and the number of dielectric layers each interleaved between internal plates was 10.

The laminate was then cut to dimensions to form green chips, which were fired to form device bodies. The green chips were fired at three different holding temperatures (temperature in the stabilized zone) as shown in Table 1. The firing process included heating, holding and cooling steps. Heating up to 600° C. of the heating step was performed in air; subsequent heating of the heating step, temperature holding step, and cooling down to 600° C. of the cooling step were performed in an oxygen atmosphere; and subsequent cooling from 600° C. was performed in air. The firing time, that is, the retention time of the temperature holding step was 4 hours. It is noted that in the heating step, binder removal was carried out by holding the temperature of 600° C. for 2 hours. At the end of firing, the varistor layer was 110 $\mu$m thick, the intermediate layer was 100 $\mu$m thick, the dielectric layers each were 7 $\mu$m thick, and internal plates each were 2 to 3 $\mu$m thick. The intermediate layer included diffusion regions which each were 10 $\mu$m thick.

The device body was barrel polished together with $ZrO_2$ balls with a diameter of 2 mm.

Next, terminal electrodes of silver were formed by Paloma method on opposed side surfaces of the device body where the internal plates were exposed. A glass protective film was formed on the entire surface of the body except for the terminal electrodes. Nickel plating and tin-lead plating were carried out in succession to form plating films on the surface of the terminal electrodes. A multi-functional multilayer device was completed in this way.

The thus obtained samples were examined by the following tests.

Varistor Properties

Using Keithley 237, a sample was measured for a varistor voltage per mm ($V_{1mA}$/mm), a voltage nonlinearity index $\alpha_1$ from 0.1 to 1 mA, and a voltage nonlinearity index $\alpha_{10}$ from 1 to 10 mA. The nonlinearity index $\alpha_1$ and $\alpha_{10}$ are calculated according to the following equations:

$$\alpha_1 = \{log(I_1/I_{0.1})/log(V_1/V_{0.1})\}$$

$$\alpha_{10} = \{log(I_{10}/I_1)/log(V_{10}/V_1)\}$$

wherein $V_{10}$, $V_1$, and $V_{0.1}$ are varistor voltages at a current flow of 10 mA (=$I_{10}$) 1 mA (=$I_1$), and 0.1 mA (=$I_{0.1}$) respectively.

According to the Electronic Material Industry Association Standard EMAS-8302, surge resistance was measured as the maximum peak current (A) with which a percent change of varistor voltage fell within±10% when an impulse current of 8/20 $\mu$s was conducted.

According to the Electronic Material Industry Association Standard EMAS-8302, maximum-energy capability was measured as the maximum-energy (J) with which a percent change of varistor voltage fell within±10% when a square wave impulse current of 2 ms was conducted.

Maximum electrostatic capability was measured by the test method of IEC 1000-4-2.

Capacitor Properties

Using an LCR meter, a capacitance and dielectric loss (tan$\delta$) were measured under conditions: voltage 1 volt, frequency 1 kHz, and temperature 25° C.

The results of measurement are shown in Table 1.

For comparison purposes, zinc oxide varistors were prepared using the varistor layer green sheets and internal plate paste. The thickness of the varistor layer was the same as in the samples shown in Table 1. These varistors were fired at the temperature shown in Table 2. The varistors were examined for varistor properties by the same tests as the samples in Table 1. The results are shown in Table 2.

Also for comparison purposes, multilayer chip capacitors were prepared using the dielectric layer green sheets and internal plate paste. The thickness and number of the dielectric layers were the same as in the samples shown in Table 1. These capacitors were fired at the temperature shown in Table 3. The capacitors were examined for capacitor properties by the same tests as the samples in Table 1. The results are shown in Table 3.

TABLE 1

Multi-functional multilayer device

| Sample No. | Firing temp (°C.) | Varistor voltage (V) | α1 | α10 | Peak current (A/mm³) | Maxium energy (J/mm³) | Electrostatic handling capability (kV/mm³) | Capacitance (pF) | tanδ (%) |
|---|---|---|---|---|---|---|---|---|---|
| 1 | 1140 | 62.8 | 31.8 | 33.2 | 290 | 1.2 | 30 | 1367 | 2.09 |
| 2 | 1150 | 43.1 | 26.5 | 28.3 | 290 | 1.2 | 30 | 1392 | 1.26 |
| 3 | 1160 | 3.89 | 18.6 | 22.4 | 280 | 1.2 | 30 | 1608 | 4.41 |

TABLE 2

Zinc oxide varistor

| Varistor No. | Firing temp (°C.) | Varistor voltage (V) | α1 | α10 | Peak current (A/mm³) | Maxium energy (J/mm³) | Electrostatic handling capability (kV/mm³) | Capacitance (pF) | tanδ (%) |
|---|---|---|---|---|---|---|---|---|---|
| 1 | 1150 | 101.5 | 43.2 | 35.6 | 250 | 1.0 | 15 | 65.8 | 1.03 |
| 2 | 1200 | 55.5 | 28.6 | 28.7 | 260 | 1.0 | 15 | 112.5 | 1.76 |
| 3 | 1250 | 27.7 | 23.0 | 25.5 | 260 | 1.0 | 15 | 249.0 | 3.48 |

TABLE 3

Multilayer chip capacitor

| Capacitor No. | Firing temp. (°C.) | Capacitance (pF) | tanδ (%) |
|---|---|---|---|
| 1 | 1150 | 1322 | 0.03 |
| 2 | 1200 | 1328 | 0.07 |
| 3 | 1250 | 1283 | 0.08 |

A comparison of Table 1 reporting the varistor and capacitor properties of multi-functional multilayer device samples according to the invention with Table 2 reporting the properties of mono-functional varistors and Table 3 reporting the properties of mono-functional capacitors reveals that multi-functional multilayer devices according to the invention exhibit varistor and capacitor properties equivalent to those of the mono-functional devices.

Figure 3:
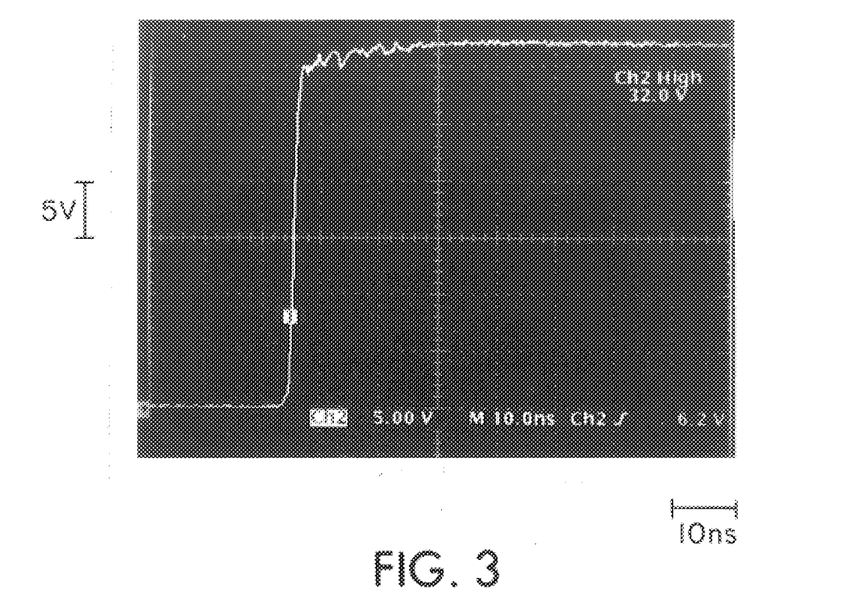
FIG. 3 is an oscillograph showing the waveform of an applied voltage from which the waveforms of output voltage shown in FIGS 4 and 5 are produced.
Figure 4:
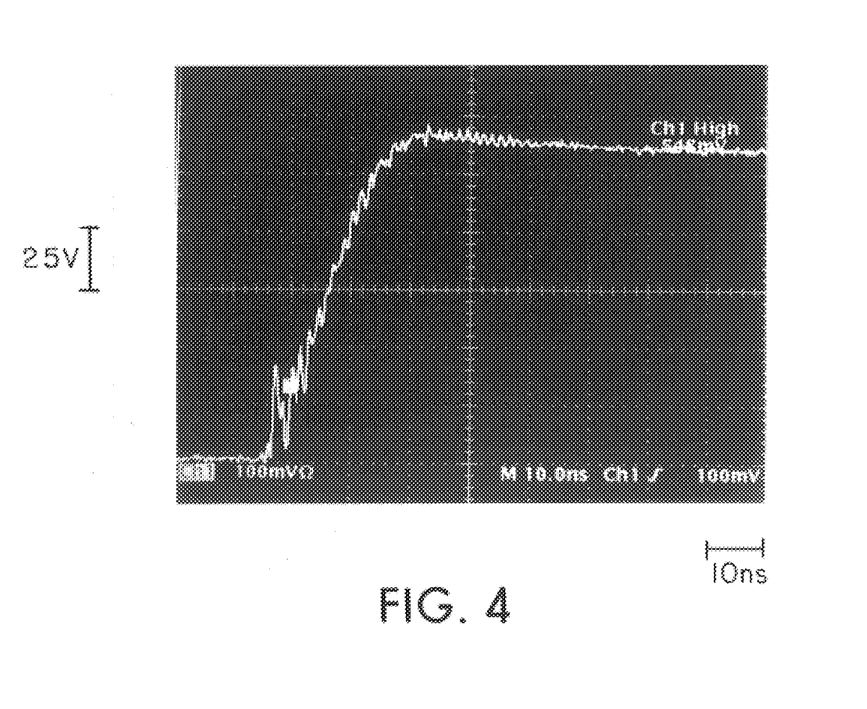
FIG. 4 is an oscillograph showing the waveform of an output voltage produced when a voltage of the waveform shown in FIG. 3 is applied across a multi-functional multi-layer device according to the invention.
Figure 5:
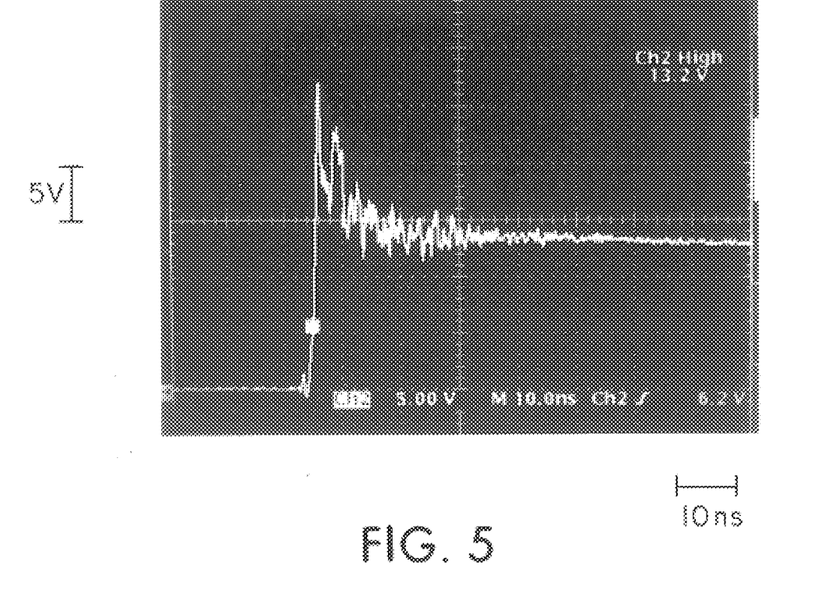
FIG. 5 is an oscillograph showing the waveform of an output voltage produced when a voltage of the waveform shown in FIG. 3 is applied across a zinc oxide varistor.

A voltage of the waveform shown in FIG. 3 was applied across device sample No. 2 in Table 1 whereupon an output voltage was measured. The results are shown in FIG. 4. For comparison purposes, a voltage of the same waveform was applied across the zinc oxide varistor whereupon an output voltage was measured. The results are shown in FIG. 5. The zinc oxide varistor cannot absorb noise of less than 10 ns as seen from FIG. 5 whereas the device of the invention can absorb quickly rising noise with a rise time of less than 10 ns as seen from FIG. 4.

Comparison in terms of dielectric layer composition

Multi-functional multilayer device samples were prepared by the same procedure as the samples in Table 1 except that raw material 1 ($BaCO_3+CaCO_3+TiO_2$), raw material 2 ($SrCO_3+CaCO_3+TiO_2$) or raw material 3 ($BaCO_3+Nd_2O_3+TiO_2$) was used as the starting material for the dielectric layers. The dielectric layers had a composition based on $(Ba,Ca)TiO_3$ when started with raw material 1, $(Sr,Ca)TiO_3$ when started with raw material 2, and $(Ba,Nd)TiO_3$ when started with raw material 3.

In these samples, the bond strength between the dielectric layer and the varistor layer was low and the dielectric layer delaminated upon firing or barreling.

Multi-functional multilayer device samples were prepared using the following composition 1 or 2 as the starting material for dielectric layers. Also prepared were multilayer chip capacitors having the same construction as the capacitor section of the device samples. The properties of these samples were measured and compared, finding that they had equivalent capacitor properties like the relationship of the device samples of Table 1 to the capacitors of Table 3.

| Dielectric layer raw material composition 1 | |
|---|---|
| $La_2O_3$ | 70.0% by weight |
| $TiO_2$ | 29.8% |
| $MnCO_3$ | 0.2% (calculated as MnO) |
| Dielectric layer raw material composition 2 | |
| $La_2O_3$ | 50.0% by weight |
| $TiO_2$ | 49.8% |
| $MnCO_3$ | 0.2% (calculated as MnO) |

Device without intermediate layer

Multi-functional multilayer device samples were prepared as the samples in Table 1 except that the intermediate layer was omitted. These samples were similarly examined to find a low voltage nonlinearity index and tanδ of more than 5%.

Device with glass-free dielectric layer

Figure 6:
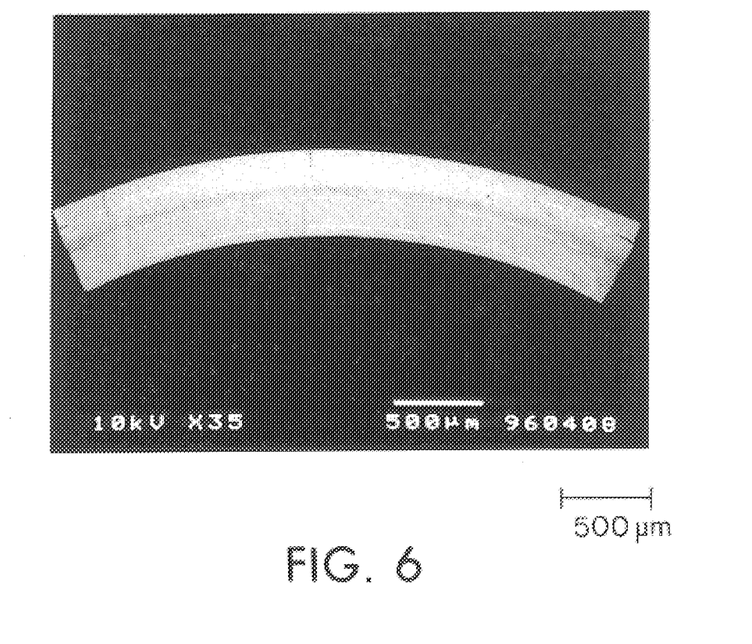
FIG. 6 is a SEM photomicrograph of a device body having a glass-free dielectric layer.

A multi-functional multilayer device sample was prepared as sample No. 2 in Table 1 except that no glass was added to the dielectric layer and the number of dielectric layers each interleaved between internal plates was 1. A cross section of this device body is shown in a photomicrograph taken through a scanning electron microscope (SEM). For comparison purposes, the SEM photomicrograph of the body of sample No. 2 in Table 1 is shown in FIGS. 7 and 8. FIG. 8 is an enlarged view of FIG. 7. As seen from FIGS. 6 to 8, the addition of glass to the dielectric layer substantially completely restrains warpage of the body. It is understood that the capacitor section is on the upper side in FIGS. 6 to 8. Two white lines which are observed in a lower portion of FIG. 8 are varistor internal plates.

Heat shrinkage curve of dielectric layer

FIG. 9 shows heat shrinkage curves of the varistor layer green sheet, the dielectric layer green sheet containing dielectric material and glass, which were used for the preparation of the samples in Table 1, and the dielectric layer green sheet containing only the dielectric material. It is seen from FIG. 9 that the dielectric layer with glass added thereto follows a heat shrinkage curve approximate to that of the varistor layer.

Japanese Patent Application No. 297438/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A multi-functional multilayer device comprising a body having a varistor section and a capacitor section disposed thereon and a pair of terminal electrodes formed on outer surfaces of said body, wherein said varistor section includes at least one varistor layer interleaved between said internal plates, said capacitor section includes at least one dielectric layer interleaved between internal plates, said varistor section and said capacitor section are electrically connected in parallel by said pair of terminal electrodes, said varistor layer contains zinc oxide as a main component and at least one lanthanide oxide as an auxiliary component, and said dielectric layer contains titanium oxide or an oxide containing lanthanum and titanium as a main component.

2. The device of claim 1 wherein said dielectric layer further contains glass.

3. The device of claim 2 wherein said dielectric layer contains 0.1 to 5% by weight of glass.

4. The device of claim 1 wherein said dielectric layer further contains manganese oxide.

5. The device of claim 4 wherein said dielectric layer contains 0.1 to 3% by weight of manganese oxide.

6. The device of claim 1 further comprising an intermediate layer between said varistor section and said capacitor section, said intermediate layer having a resistivity which is higher than the lower one of the resistivity of said varistor layer and the resistivity of said dielectric layer.

7. The device of claim 6 wherein said intermediate layer contains at least one oxide selected from the group consisting of zinc oxide, lanthanide oxide, titanium oxide, an oxide containing lanthanum and titanium, and mixtures thereof.

8. The device of claim 7, wherein said oxide contained in said intermediate layer is a main component.

9. The device of claim 1 wherein an internal plate of said varistor section and an internal plate of said capacitor section which are disposed adjacent to each other via an interface between said varistor section and said capacitor section are connected so as to receive an equal potential.

10. A method for preparing a multi-functional multilayer device according to claim 1, comprising the steps of:

forming a green body comprising a green sheet containing a raw material powder of the varistor layer and another green sheet containing a raw material powder of the dielectric layer and firing the green body in an atmosphere having an oxygen concentration higher than the oxygen concentration of air in a temperature range of higher than 700° C.

11. The device of claim 7, wherein said oxide contained in said intermediate layer comprises an oxide selected from the group consisting of ZnO, $TiO_2$, and $La_2Ti_2O_7$, and mixtures thereof.

12. The device of claim 11, wherein said oxide contained in said intermediate layer comprises ZnO as a main component and an oxide selected from the group consisting of $TiO_2$ and $La_2Ti_2O_7$, and mixtures thereof.

* * * * *